US007460054B2

(12) United States Patent
Kim et al.

(10) Patent No.: US 7,460,054 B2
(45) Date of Patent: Dec. 2, 2008

(54) APPARATUS AND METHOD FOR ADJUSTING OPTIMUM TILT OF RADAR COVER ACCORDING TO WEATHER CONDITIONS

(75) Inventors: Jee-Young Kim, Gyeonggi-do (KR); Bong-Chul Ko, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/818,619

(22) Filed: Jun. 15, 2007

(65) Prior Publication Data

US 2008/0136719 A1 Jun. 12, 2008

(30) Foreign Application Priority Data

Dec. 12, 2006 (KR) ...................... 10-2006-0125991

(51) Int. Cl.

| | |
|---|---|
| *G01S 13/86* | (2006.01) |
| *G01S 13/93* | (2006.01) |
| *H01Q 1/32* | (2006.01) |
| *H01Q 1/42* | (2006.01) |

(52) U.S. Cl. ........................... 342/61; 342/70; 343/872; 343/711; 343/713

(58) Field of Classification Search ................. 343/872; 342/22, 70–72, 52, 61
See application file for complete search history.

(56) References Cited

U.S. PATENT DOCUMENTS 3,984,837 A * 10/1976 Tatnall ........................ 343/705
5,066,921 A * 11/1991 Rope et al. .................. 324/639
6,414,623 B1 * 7/2002 Ashihara ..................... 342/70
6,947,003 B2 * 9/2005 Huor .......................... 343/770
6,975,279 B2 * 12/2005 Delgado et al. ............. 343/872
7,030,834 B2 * 4/2006 Delgado et al. ............. 343/872
7,088,308 B2 * 8/2006 Delgado et al. ............. 343/872

FOREIGN PATENT DOCUMENTS

JP 09331203 A * 12/1997
JP 1998-123248 5/1998
JP 2001-228238 7/2001
JP 2003-255041 9/2003
JP 2004-347512 12/2004
JP 2005-337759 10/2005

* cited by examiner

*Primary Examiner*—Thomas H. Tarcza
*Assistant Examiner*—Cassi Galt
(74) *Attorney, Agent, or Firm*—Peter F. Corless; Edwards Angell Palmer & Dodge LLP

(57) ABSTRACT

There are provided systems and methods for adjusting the tilt of a radar cover in response to change of weather condition by calculating dielectric constant of external air, optimum thickness of radar cover, and then optimum tilt angle of radar cover, and adjusting the position of the radar cover.

8 Claims, 6 Drawing Sheets

APPARATUS AND METHOD FOR ADJUSTING OPTIMUM TILT OF RADAR COVER ACCORDING TO WEATHER CONDITIONS

CROSS-REFERENCE TO RELATED APPLICATIONS

The present application is based on, and claims priority from, Korean Patent Application Serial Number 10-2006-0125991, filed on Dec. 12, 2006, the disclosure of which is hereby incorporated by reference herein in its entirety.

TECHNICAL FIELD

The present invention relates to systems and methods for adjusting an optimum tilt angle of a radar cover in response to change of weather conditions.

BACKGROUND ART

In recent years, technologies related to adaptive cruise control (ACC) and chassis dynamometer (CDM) have been intensively developed. ACC is a technology that automatically adjusts vehicle speed to maintain a selected distance from a preceding vehicle. CDM is a machine used to warn a driver of potential collision and operate a brake accordingly. A vehicle with ACC and CDM uses forward-looking radar to detect a preceding vehicle. Typically, the front surface of the radar is covered by a radar cover in order to protect the radar from surrounding environments including moisture. The radar cover oftentimes poses a problem. For example, it can cause the radar to lose a signal by blocking the radar wave. This problem becomes serious, in particular, when a loss is caused by reflection of the radar wave due to the thickness of the radar cover.

A prior art technology was proposed to solve this problem by optimizing the thickness of the radar cover so as not to cause such refraction. More particularly, in the proposed technology, the tilt of the front surface of the cover and the wavelength of the radar wave are used to calculate an optimum thickness of the cover.

calculated for a normal weather condition. That is, it is calculated by using a dielectric constant of the air which is for the weather condition where it does not rain. However, the equivalent dielectric constant of the air changes by snow, fog, rain, and the like, since the refractive index of the radar wave changes. The radar thus does not perform well in the event of weather changes.

There is thus a need for a new technology that can solve the problems associated with the prior art technology.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides systems and methods that can solve the above-described problems associated with prior art.

In one aspect, the present invention provides a radar system for a vehicle, comprising: a radar; a radar cover mounted on a front surface of the radar; an actuator connected to the radar cover for adjusting an tilt angle of the radar cover; a terminal device provided with a part of the vehicle for detecting information on external weather conditions; and a controller connected to the actuator for determining, based on the weather information received from the terminal device, an optimum tilt angle of the radar cover that can minimize attenuation of radar wave caused by the radar cover, and operating the actuator to adjust the position of the radar cover so as to realize the optimum tilt angle.

In a preferred embodiment, the controller calculates, from the weather information received from the terminal device, dielectric constant of the air surrounding the radar cover.

In another preferred embodiment, the controller calculates, from the calculated dielectric constant, an optimum thickness of the radar cover that can make the impedance of radar cover and that of external space of the radar cover equal.

In still another preferred embodiment, the controller calculates, from the calculated optimum thickness of the radar cover, an optimum tilt angle of the radar cover that can minimize attenuation of radar wave caused by the radar cover.

In another aspect, the present invention provides a method for adjusting the position of a radar cover for a vehicle in response to external weather conditions, comprising the steps of: (a) receiving weather information from a terminal device provided with a part of the vehicle; (b) determining, based on the weather information received from the terminal device, an optimum tilt angle of the radar cover that can minimize attenuation of radar wave caused by the radar cover; and (c) adjusting the position of the radar cover so as to realize the optimum tilt angle.

In a preferred embodiment, the method may further comprise, prior to the step (c), the step of calculating, from the weather information received from the terminal device, dielectric constant of the air surrounding the radar cover.

In a further preferred embodiment, the method may further comprise, prior to the step (c), the step of calculating, from the calculated dielectric constant, an optimum thickness of the radar cover that can make the impedance of radar cover and that of external space of the radar cover equal.

In yet a further preferred embodiment, the method may further comprise, prior to the step (c), the step of calculating, from the calculated optimum thickness of the radar cover, an optimum tilt angle of the radar cover that can minimize attenuation of radar wave caused by the radar cover.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present systems and methods will be particularly useful with a wide variety of motor vehicles.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
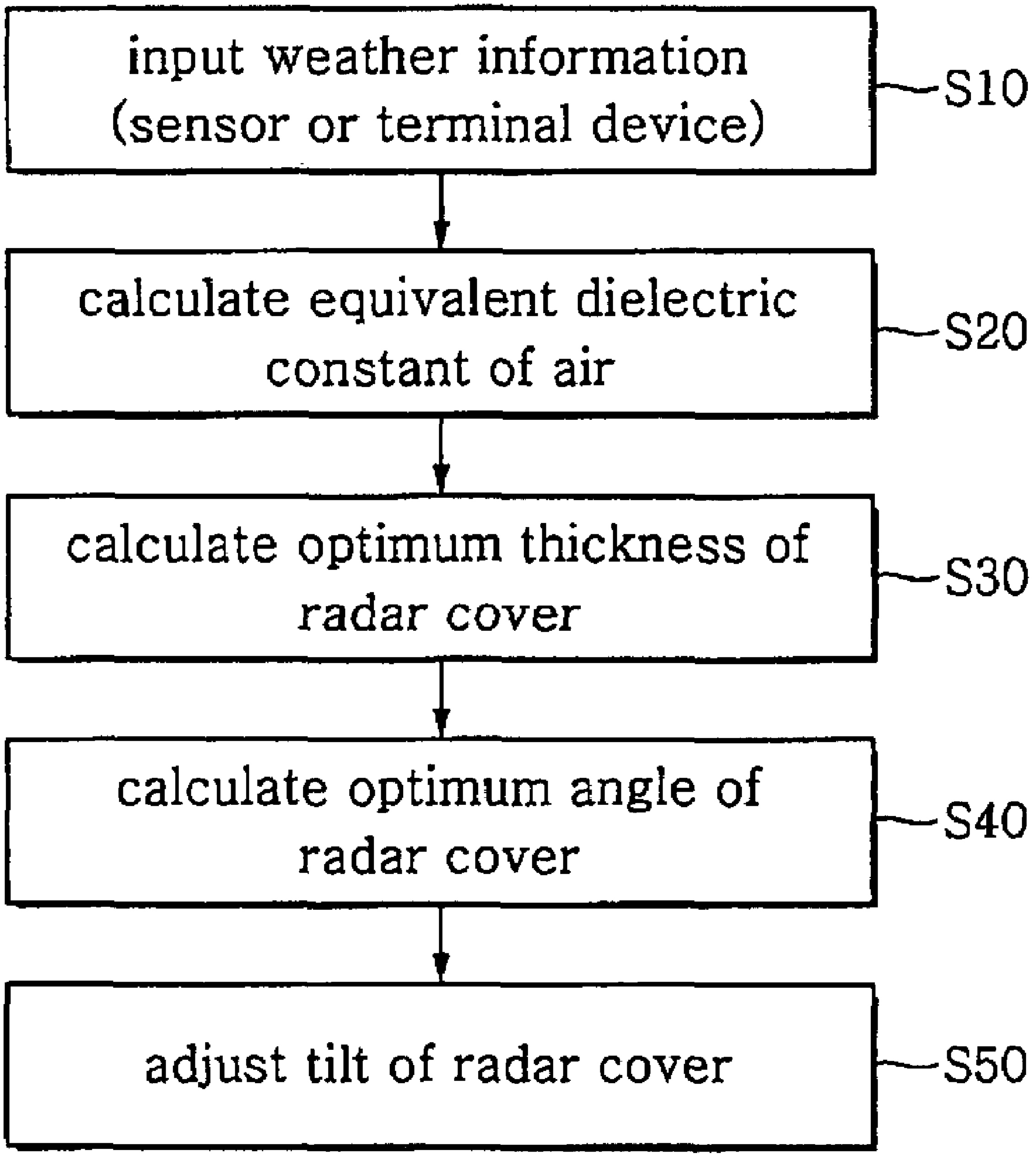
FIG. 1 is a flowchart illustrating a calculating process that adjusts the tilt of a radar cover according to weather information.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

In general, radar wave can be attenuated by several factors including dielectric constant of the air, and kind of material of a radar cover and thickness thereof. For example, where a radar cover is made of a particular material, the thickness of the cover needs to be changed according to the dielectric constant of the air in order to minimize the attenuation. Practically, it is difficult to change the thickness of the cover. However, changing the thickness along a path through which radar wave passes can be made by changing the tilt of the cover. To this end, there is provided a system for adjusting the tilt of a radar cover, which calculates a thickness of the cover that can minimize the attenuation of radar wave and then calculates an optimum tilt angle of the cover that allows the path of the radar wave to have the thus-calculated thickness.

FIG. 1 is a flowchart illustrating a overall process for adjusting the tilt of a radar cover according to weather information.

As shown in FIG. 1, information on weather conditions, such as snow, rain, and fog, is received from a terminal device or another sensor (S10), and an equivalent dielectric constant of the air is calculated (S20). Then, an optimum thickness of the radar cover to minimize the wave attenuation is calculated (S30), and an optimum tilt angle of the radar cover is calculated so as to realize the optimum thickness (S40). The tilt of the radar cover is adjusted by an actuator to realize the optimum tilt angle (S50).

Figure 2:
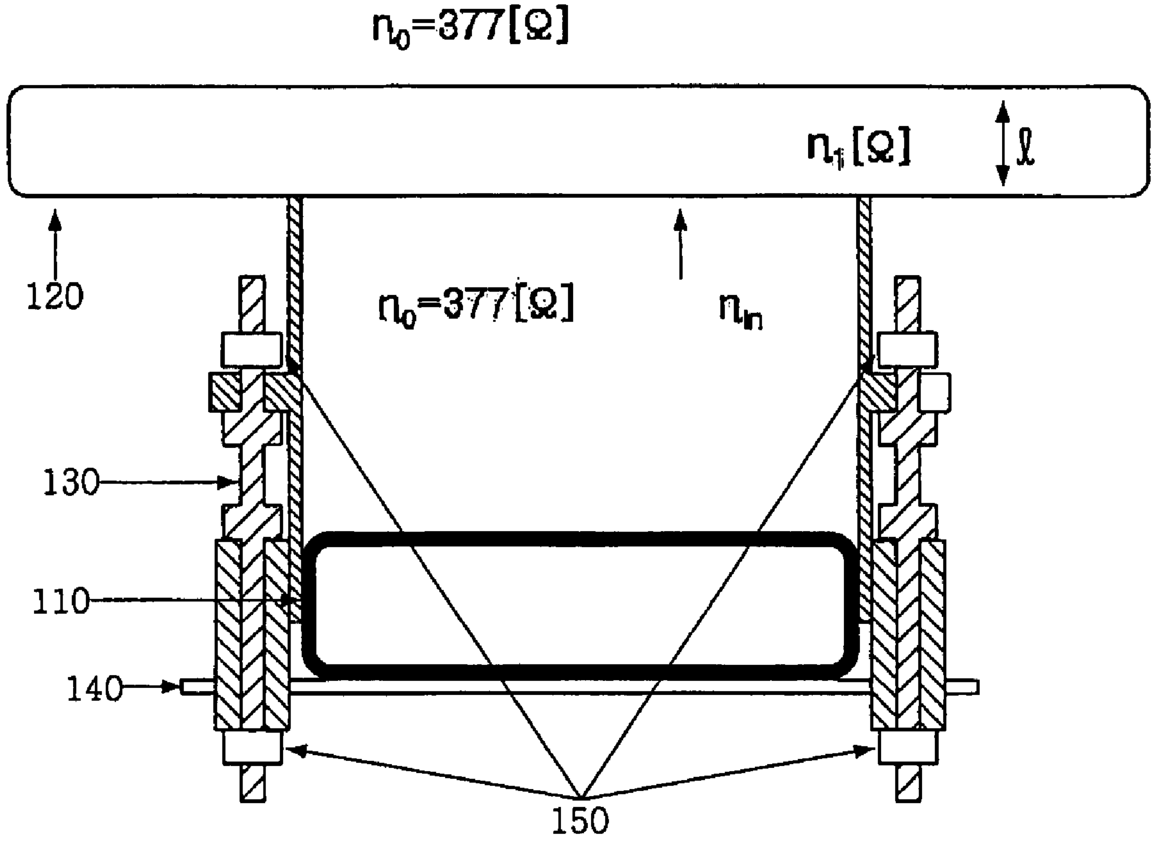
FIG. 2 is a plan view illustrating a system for adjusting the tilt of a radar cover according to an embodiment of the invention.

FIG. 2 is a view illustrating a general radar system. The radar system includes a radar 110, a radar cover 120, adjusting bolts 130, a radar bracket 140, and fixing nuts 150. Further, wave impedance of radar cover 120 and that of the air are denoted by $\eta_1$, and $\eta_0$, respectively.

When it does not snow or rain, it is assumed that the dielectric constant $\epsilon_r$ is 1 and the wave impedance $\eta_0$ of the air is 377[Ω]. Here, in order to minimize the attenuation of radar wave, the impedance of the radar cover and that of the external space of the radar cover must be equal. That is, the following condition is required to be established:

$$\eta_{in}=\eta_0=377[\Omega]$$

Thus, the following equation is used to calculate the thickness l of radar cover 210.

$$377=\eta_1\frac{377+j\eta_1\tan\beta_1 l}{\eta_1+j377\tan\beta_1 l}$$

or, $$j377^2\tan\beta_1 l=j\eta_1^2\tan\beta_1 l$$

A condition that always satisfies the above equation regardless of $\eta_1$ is:

$$\beta_1 l=n\pi$$

When the radar cover is formed of, for example, polyethylene having the dielectric constant of 2.25 and the radar wave has the frequency of 77 GHz, the thickness l of the radar cover is as follows:

$$l=\frac{\lambda_1}{2}=\frac{v_1}{2f_1}=\frac{3*10^8}{2\sqrt{2.25}*77*10^9}=1.3\ [\text{mm}]$$

Here, the thickness condition is n=1. When the thickness condition is set to n=3 so as to obtain the optimum thickness, the thickness becomes 3.9 mm.

Figure 3:
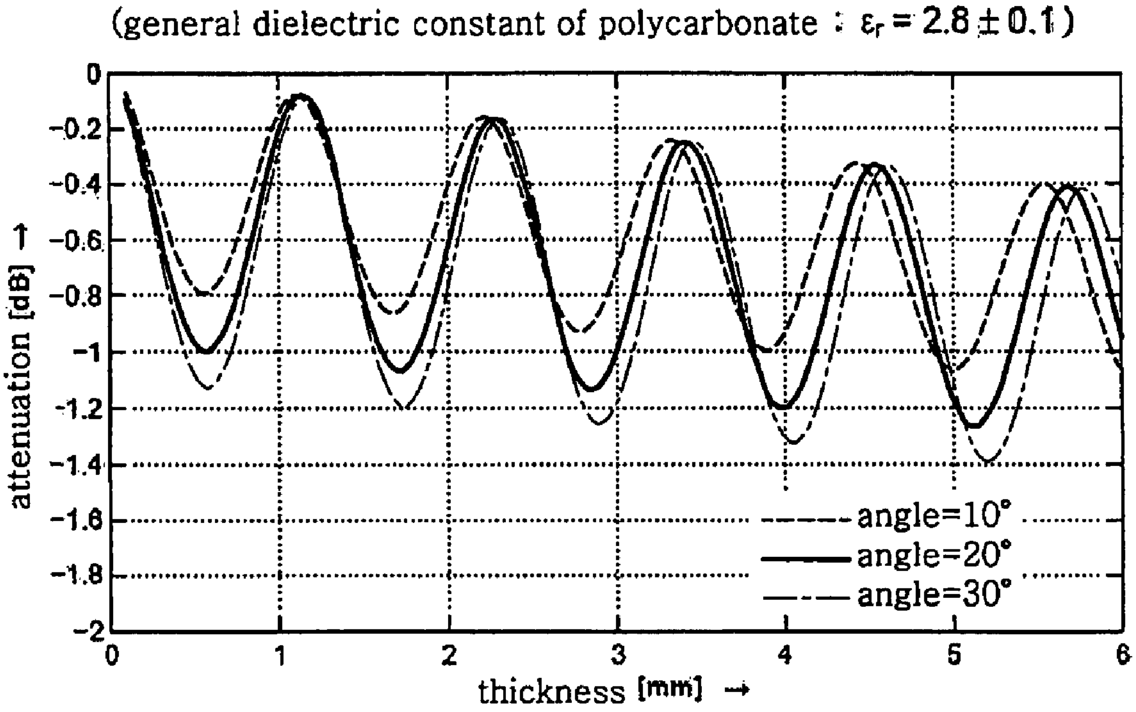
FIG. 3 is a chart illustrating attenuation of radar waves according to the tilt and thickness of the radar cover.

FIG. 3 is a view illustrating that the attenuation characteristics of radar waves are affected by the tilt and the thickness of a radar cover. More particularly, when the tilt of the radar cover changes, a path through which the radar wave passes in the radar cover changes, which in turn has an effect as if the thickness of the radar cover changes.

Figure 4:
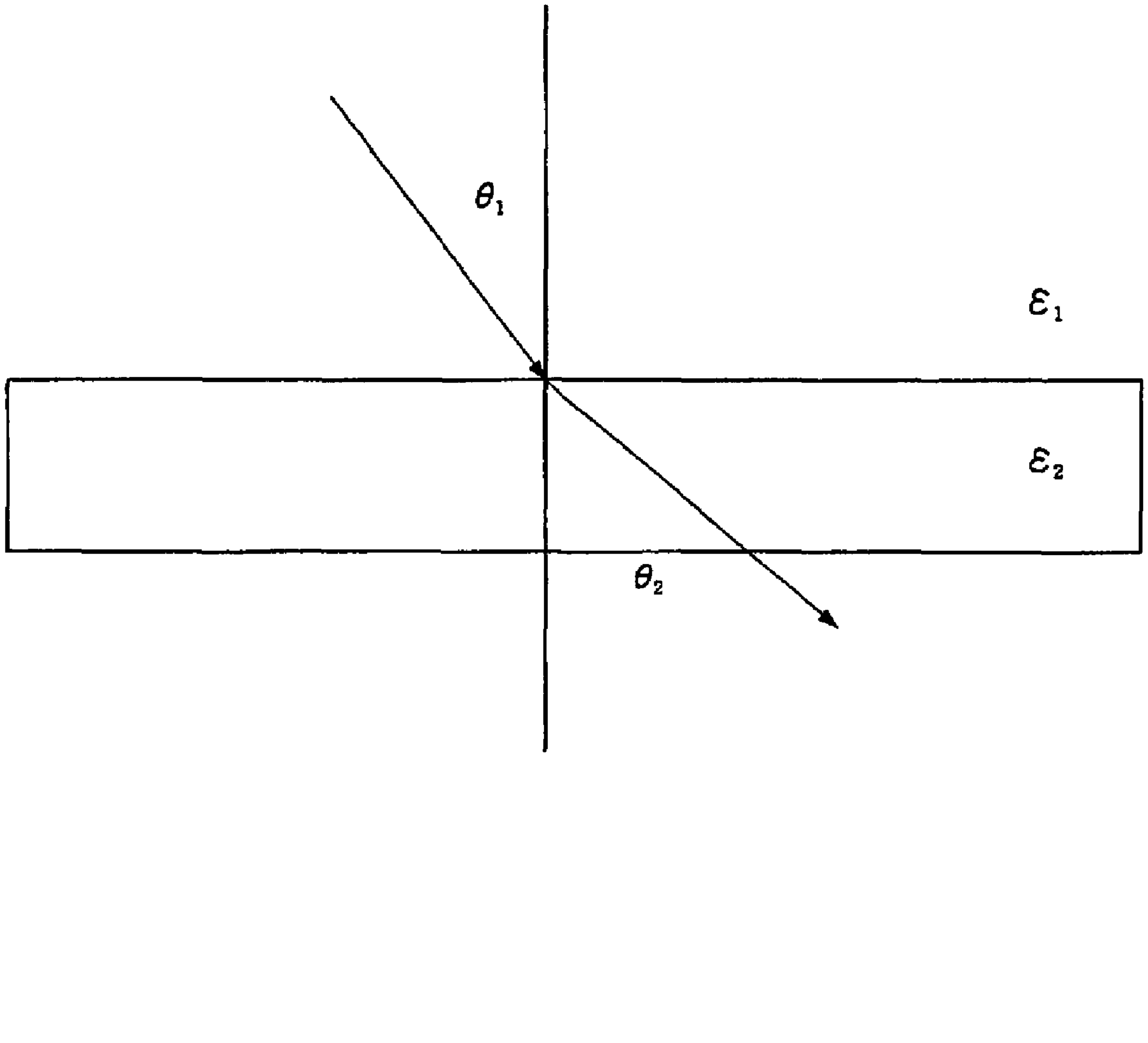
FIG. 4 is a view illustrating refraction of an electromagnetic wave at the boundary between mediums.
Figure 5:
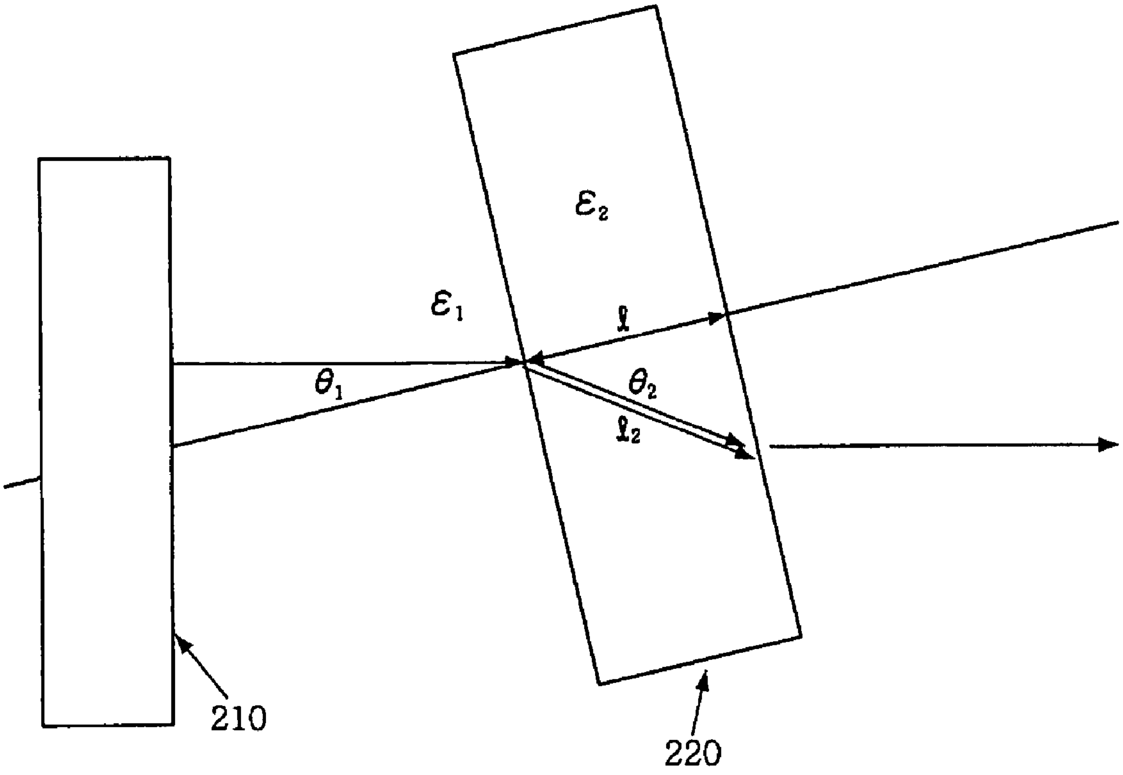
FIG. 5 is a view illustrating an expression that calculates the optimum thickness according to the tilt of the radar cover.

FIG. 4 is a view illustrating the refractive index of an electromagnetic wave at the boundary between two different media. FIG. 5 is a view illustrating an optimum tilt of a radar cover according to a change in refractive index.

When an electromagnetic wave is incident on a medium having the dielectric constant of ]2 from a medium having the dielectric constant of ]1 at an angle of θ1, the electromagnetic wave is refracted at an angle of θ2, which may be represented by the following equation:

$$\frac{\tan\theta_1}{\tan\theta_2}=\frac{\varepsilon_1}{\varepsilon_2}$$

When weather changes due to rain, snow, fog, and the like, the equivalent dielectric constant of the air changes, and thus the refractive index between the media changes. Further, the path through which the radar wave is made incident on the medium of the radar cover changes, and the total length of that path changes. As a result, the attenuation characteristics of the radar wave change. As such, when the refractive index between the media changes according to the change of the weather, the optimum thickness of the radar cover that can minimize the attenuation.

Therefore, as shown in FIG. 5, if $\theta_1$ is adjusted so that $l_2$ becomes the optimum thickness, it is possible to obtain the tilt of the radar cover that can minimize the attenuation. That is, since the thickness l of the radar cover and the desired thickness $l_2$ are known, $\theta_2$ can be obtained by using the following equation:

$$l_2=3.9\ [\text{mm}]=\frac{l}{\cos\theta_2}$$

When $\theta_2$ is determined, since $]_1$ and $]_2$ are known, the desired angle $\theta_1$ of the radar cover can be obtained by using the following equation:

$$\theta_2 = \tan^{-1}\left(\frac{\varepsilon_2}{\varepsilon_1}\tan\theta_1\right)$$

Figure 6:
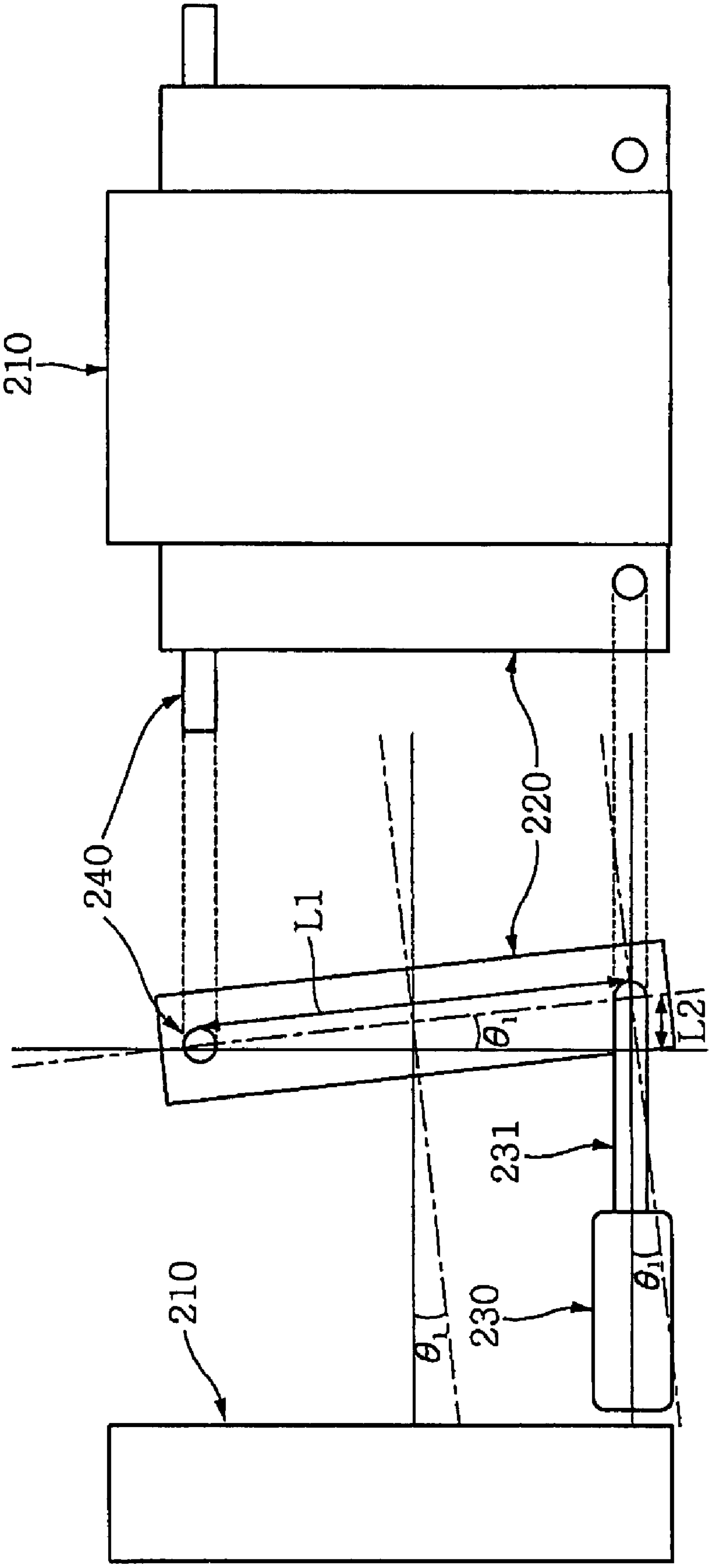
FIG. 6 is a view illustrating a side view and a plan view of a radar system according to an embodiment of the invention.

FIG. 6 is a view illustrating a radar system according to an embodiment of the present invention. The radar system includes a radar 210, a radar cover 220, a stepping motor 230, fixing pins 240, and a controller (not shown). The left portion of FIG. 6 shows a side view of the radar system, and the right portion of FIG. 6 shows a plan view thereof.

Referring to FIG. 6, an upper part of a radar cover 220 is fixed to a vehicle grill by fixing pin(s) 240 and serves as a rotary axis. A lower part of the radar cover 220 is connected to an actuator for adjusting the tilt of the cover. An example of such actuator is, preferably, a stepping motor 230. The length $L_2$ is adjusted according to the operation of the actuator.

The stepping motor 230 is attached to one side of a screw 231. The length of the stepping motor 230 can be adjusted by rotation of the screw 231. The other side of screw 231 is connected to the lower part of radar cover 220 so as to adjust an angle of the radar cover. While the stepping motor is shown as an example of the actuator, another actuator may be used as long as it can adjust an angle of a radar cover.

Even though the controller is not shown, it may be mounted to the radar 210 or the stepping motor 230, or formed as a separate device. The controller receives weather information through a sensor or another terminal device that can detect weather conditions, calculates an optimum thickness of the radar cover on the basis of the received weather information, and calculates an optimum tilt angle of the radar cover so as to realize the optimum thickness.

The controller needs to calculate the extended length $L_2$ of the stepping motor so as to tilt the radar cover as much as the calculated tilt. This can be calculated by the following relation:

$$\theta_1 = \sin^{-1}\left(\frac{L_1}{L_2}\right)$$

The stepping motor 230 rotates and extends the screw 231 according to the value $L_2$ calculated by the above equation, such that the lower side of the radar cover 220 is pushed out. As a result, it is possible to tilt the radar cover 220 as much as the tilt $\theta_1$.

According to the preferred embodiments of the present invention, the tilt of the radar cover can be adjusted to correspond to the optimum thickness of the radar cover even when weather changes. Therefore, it is possible to provide a radar cover that can minimize the wave attenuation.

According to the preferred embodiments of the present invention, it is possible to realize the best sensing performance by calculating the optimum thickness of the radar cover in consideration of the weather and changing the tilt of the radar cover.

Further, when adaptive cruise control systems (including CDM) perform the control, detecting of front vehicles with reliability is directly linked with safety and merchantability of the system. As the sensing performance is improved by the present systems according to the embodiments of the invention, it is possible to improve control performance of the system, ride comfort and safety of a driver, and provide consistent performance regardless of a variety of weather conditions changing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radar system for a vehicle, comprising:

a radar;

a radar cover mounted on a front surface of the radar;

an actuator connected to the radar cover for adjusting a tilt angle of the radar cover;

a terminal device provided with a part of the vehicle for detecting information on external weather conditions; and a controller connected to the actuator for determining, based on the weather information received from the terminal device, an optimum tilt angle of the radar cover that can minimize attenuation of a radar wave caused by the radar cover, and operating the actuator to adjust the position of the radar cover so as to realize the optimum tilt angle.

2. The radar system of claim 1, wherein the controller calculates, from the weather information received from the terminal device, the dielectric constant of the air surrounding the radar cover.

3. The radar system of claim 2, wherein the controller calculates, from the calculated dielectric constant, an optimum thickness of the radar cover that can make the impedance of the radar cover and that of the external space of the radar cover equal.

4. The radar system of claim 3, wherein the controller calculates, from the calculated optimum thickness of the radar cover, an optimum tilt angle of the radar cover that can minimize attenuation of the radar wave caused by the radar cover.

5. A method for adjusting the position of a radar cover for a vehicle in response to external weather conditions, comprising the steps of:

receiving weather information from a terminal device provided with a part of the vehicle;

determining, based on the weather information received from the terminal device, an optimum tilt angle of the radar cover that can minimize attenuation of a radar wave caused by the radar cover; and adjusting the position of the radar cover so as to realize the optimum tilt angle.

6. The method of claim 5, further comprising, prior to the step of adjusting the position of the radar cover, the step of calculating, from the weather information received from the terminal device, the dielectric constant of the air surrounding the radar cover.

7. The method of claim 6, further comprising, prior to the step of adjusting the position of the radar cover, the step of calculating, from the calculated dielectric constant, an optimum thickness of the radar cover that can make the impedance of the radar cover and that of external space of the radar cover equal.

8. The method of claim 7, further comprising, prior to the step of adjusting the position of the radar cover, the step of calculating, from the calculated optimum thickness of the radar cover, an optimum tilt angle of the radar cover that can minimize attenuation of the radar wave caused by the radar cover.

* * * * *